(12) United States Patent
Kodama

(10) Patent No.: US 7,265,469 B2
(45) Date of Patent: Sep. 4, 2007

(54) SPINDLE MOTOR HAVING DYNAMIC PRESSURE FLUID BEARING

(75) Inventor: Mitsuo Kodama, Fujieda (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 11/434,781

(22) Filed: May 17, 2006

(65) Prior Publication Data

US 2006/0267434 A1    Nov. 30, 2006

(30) Foreign Application Priority Data

May 30, 2005   (JP) ............................. 2005-156866

(51) Int. Cl.
*H02K 7/08* (2006.01)
(52) U.S. Cl. ........................ 310/90; 384/107
(58) Field of Classification Search .................. 310/90, 310/90.5; 384/107
See application file for complete search history.

(56) References Cited

U.S. PATENT DOCUMENTS 5,956,204 A * 9/1999 Dunfield et al. ......... 360/98.07

7,133,250 B2 * 11/2006 Herndon et al. ......... 360/99.08

FOREIGN PATENT DOCUMENTS

JP    2004-11897 A    1/2004

* cited by examiner

*Primary Examiner*—Dang Le
(74) *Attorney, Agent, or Firm*—Connolly Bove Lodge & Hutz LLP

(57) ABSTRACT

A spindle motor includes a rotor section, a stator section, and thrust and radial dynamic pressure fluid bearings. The thrust dynamic pressure fluid bearing includes first and second thrust dynamic pressure fluid bearing sections each generating a dynamic pressure in a direction opposite to each other. Lubrication fluid is filled in a filling section as a prescribed gap between the rotor and stator sections. The filling section includes a first filling section linking one end section opened to the outside, the second thrust dynamic pressure fluid bearing section, the first thrust dynamic pressure fluid bearing section and the radial dynamic pressure fluid bearing in order and a second filling section linking a point allocated between the second and first thrust dynamic pressure fluid bearing sections and another point allocated between the first thrust dynamic pressure fluid bearing section and the radial dynamic pressure fluid bearing in the first filling section.

3 Claims, 7 Drawing Sheets

SPINDLE MOTOR HAVING DYNAMIC PRESSURE FLUID BEARING

BACKGROUND OF THE INVENTION

1. Field of the Invention

The present invention relates to a spindle motor, particularly, relates to a spindle motor having a dynamic pressure fluid bearing.

2. Description of the Related Art

Since a spindle motor having a dynamic pressure fluid bearing is excellent in characteristics while rotating at higher speed, such a spindle motor is mostly utilized for driving recording mediums such as magnetic discs and optical discs in a recording and reproducing apparatus.

One example of conventional spindle motors having a dynamic pressure fluid bearing was disclosed in the Japanese publication of unexamined patent applications No. 2004-11897. The spindle motor disclosed in the Japanese publication of unexamined patent applications No. 2004-11897 is provided with a pair of radial bearing sections, which is constituted by a shaft and a sleeve, and a thrust bearing section, which is constituted by an upper surface of the sleeve and an internal surface of a hub.

On the other hand, besides the spindle motor in the above-mentioned configuration, another spindle motor that is provided with two thrust bearing sections has been studied. The other spindle motor is constituted such that a flange protruding outside a sleeve and a seal plate are disposed in an axial direction in the sleeve side with being apart from each other so as to be excellent in vibration tolerance and shock resistance, which are required for portable equipment.

Further, the spindle motor is constituted such that a thrust ring provided in a hub side is sandwiched between the flange and the seal plate. Consequently, the two thrust bearing sections are constituted by upper and lower two surfaces of the thrust ring and surfaces of the flange and the seal plate, which confront with the upper and lower two surfaces of the thrust ring respectively.

With referring to FIG. 10, a spindle motor used in a hard disc drive (HDD) for one-inch disc is depicted as one example of such a spindle motor mentioned above.

FIG. 10 is a cross sectional view of a conventional spindle motor according to the prior art. In FIG. 10, a spindle motor 151 is composed of a stator 114 and a rotor 112.

The stator 114 is further composed of a motor base 108, a sleeve 104, which is fixed to the motor base 108 and formed with a flange section 104a that is disposed in one end portion of the sleeve 104, and a core 109.

Further, a coil 110 is wound around the core 109, and a seal plate 117 in a ring shape is fixed to the other end potion of the sleeve 104.

On the other hand, the rotor 112 is further composed of a hub 107, wherein a ring magnet 111 is fixed on an outer circumferential surface of the hub 107. The hub 107 is integrally formed with a shaft 101 in the middle of the hub 107. An outer cylindrical section 113 is engaged with and fixed on an outer circumferential surface of the shaft 101.

Further, a thrust ring 103 is fixed on an inner circumferential surface of the hub 107.

Furthermore, the outer cylindrical section 113 of the rotor 112 is inserted into a center hole of the sleeve 104 of the stator 114.

Accordingly, the rotor 112 is sustained by the stator 114, and results in being rotatable freely with respect to the stator 114 through a dynamic pressure fluid bearing to be detailed next.

Thrust dynamic pressure fluid bearings SB11 and SB12 are constituted by the thrust ring 103, the flange section 104a, the seal plate 117 and lubrication fluid (hereinafter referred to as lubricant) filled in gaps among them.

More specifically, a pair of dynamic pressure grooves (not shown), which are formed on both of top and bottom surfaces of the thrust ring 103 in the axial direction, generates a dynamic pressure in accordance with revolution of the rotor 112 and exhibits a function of thrust bearing.

In other words, a dynamic pressure, which raises the rotor 112, is generated by a bottom surface of the thrust ring 103 and a top surface of the seal plate 117 and another dynamic pressure, which lowers the rotor 112, is generated by a top surface of the thrust ring 103 and a bottom surface of the flange 104a, and balancing both the dynamic pressures makes the rotor 112 float and hold with respect to the stator 114.

Radial dynamic pressure fluid bearings RB11 and RB12 are constituted by the outer cylindrical section 113, the sleeve 104 and lubricant filled in gaps between them.

More specifically, dynamic pressure grooves, which are formed on either surface of an outer circumferential surface of the outer cylindrical section 113 and an inner circumferential surface of the sleeve 104, generates a dynamic pressure in accordance with revolution of the rotor 112 and exhibits a function of radial bearing, wherein the outer circumferential surface of the outer cylindrical section 113 confronts with the inner circumferential surface of the sleeve 104.

The radial dynamic pressure fluid bearings RB11 and RB12 are provided in pairs with being apart from each other in the axial direction.

In the above-mentioned configuration, a filling route of lubricant is formed so as to link the two thrust dynamic pressure fluid bearings SB11 and SB12 and the two radial dynamic pressure fluid bearings RB11 and RB12 with connecting them in series.

Further, the dynamic pressure generated by the thrust dynamic pressure fluid bearings SB11 and SB12 is directed toward a direction of so-called "pump-in" so as to prevent lubricant from leaking out from the thrust dynamic pressure fluid bearings SB11 and SB12 while the rotor 112 rotates.

In other words, the dynamic pressure generated by the thrust dynamic pressure fluid bearings SB11 and SB12 is generated so as to direct the lubricant inward to the radial dynamic pressure fluid bearings RB11 and RB12 if it is described along the filling route of the lubricant.

In the above-mentioned spindle motor having two thrust dynamic pressure fluid bearings, a groove shape of dynamic pressure grooves provided in the two thrust dynamic pressure fluid bearings respectively is formed with having slight difference between them due to variations in fabricated dimensions and variety of materials when manufacturing. If the difference exceeds a certain level, a generated dynamic pressure creates further difference that is not to be ignored. Particularly, the higher the rotational speed of the rotor is, the more the difference is made remarkable.

More specifically, in some cases, a rotor may be excessively raised or lowered by the unbalanced dynamic pressure, and resulting in a problem such that the rotor may accidentally contact with a stator.

Further, a thrust dynamic pressure fluid bearing disposed outside the filling route of lubricant, that is, the thrust dynamic pressure fluid bearing SB12 constituted by the bottom surface of the thrust ring 103 and the top surface of the seal plate 117 is formed so as to "pump-in" the lubricant. At the same time, another thrust dynamic pressure fluid bearing disposed inside the filling route of lubricant, that is, the thrust dynamic pressure fluid bearing SB11 constituted by the top surface of the thrust ring 103 and the bottom surface of the flange 104a is also formed as the "pump-in" configuration so as not to "pump-out" the lubricant although a groove shape of dynamic pressure grooves provided in the two thrust dynamic pressure fluid bearings respectively is formed with having slight difference between them due to variations in fabricated dimensions and variety of materials when manufacturing.

On the contrary, in case revolution of the rotor is in higher speed, particularly, a "pump-in" pressure caused by the two thrust dynamic pressure fluid bearings increases.

Further, centrifugal force is added to the inside thrust dynamic pressure fluid bearing, and resulting in increasing a pressure of lubricant filled in the dynamic pressure fluid bearings excessively more than necessary.

As a result, force that separates the rotor 112 from the stator 114 increases excessively and the force defeats another force, which is generated by the inner thrust dynamic pressure fluid bearing and functions so as to make the rotor 112 lower, and resulting in a problem such that the rotor 112 is made contact with the stator 114.

On the other hand, lubricant has a particular temperature characteristic: the lower the liquid temperature is, the higher the viscosity is. Consequently, a "pump-in" pressure increases in accordance with lowering temperature. In some cases, a rotor is raised excessively by increasing "pump-in" pressure, and resulting in contacting the rotor with a stator.

On the contrary, viscosity decreases in accordance with rising liquid temperature, so that the "pump-in" pressure decreases. In some cases, the rotor is lowered excessively, and resulting in contacting the rotor with the stator.

In other words, the rotor possibly contacts with the stator in case liquid temperature, that is, ambient temperature changes heavily.

If the rotor contacts with the stator, load is added to revolution of the rotor, and resulting in increasing power consumption of the spindle motor.

Further, contacting the rotor with the stator creates another problem related to reliability such that vibration of a shaft increases and resulting in shortening a life of the spindle motor.

SUMMARY OF THE INVENTION

Accordingly, in consideration of the above-mentioned problems of the prior arts, an object of the present invention is to provide a spindle motor having a dynamic pressure fluid bearing in which power consumption does not increase while rotating at high speed, and the spindle motor exhibits higher reliability.

Further, the spindle motor having a dynamic pressure fluid bearing does not increase power consumption and exhibits higher reliability even by heavy ambient temperature change.

In order to achieve the above object, the present invention provides, according to an aspect thereof, a spindle motor comprising: a rotor section; a stator section; and a thrust dynamic pressure fluid bearing and a radial dynamic pressure fluid bearing for sustaining the rotor section to be rotatable freely with respect to the stator section by employing lubrication fluid, wherein the thrust dynamic pressure fluid bearing is provided with first and second thrust dynamic pressure fluid bearing sections each generating a dynamic pressure in a direction opposite to each, other, and wherein the lubrication fluid is filled in a filling section as a prescribed gap provided between the rotor section and the stator section, and wherein the filling section is constituted by a first filling section that links one end section opened to the outside, the second thrust dynamic pressure fluid bearing section, the first thrust dynamic pressure fluid bearing section and the radial dynamic pressure fluid bearing in order and a second filling section that links a point allocated between the second and first thrust dynamic pressure fluid bearing sections and another point allocated between the first thrust dynamic pressure fluid bearing section and the radial dynamic pressure fluid bearing in the first filling section.

Other object and further features of the present invention will be apparent from the following detailed description when read in conjunction with the accompanying drawings.

DETAILED DESCRIPTION OF THE PREFERRED EMBODIMENTS

First Embodiment

A spindle motor according to a first embodiment of the present invention is such a spindle motor having a dynamic pressure fluid bearing for driving a disc as the spindle motor is installed in a hard disc drive (HDD) for one-inch disc. The spindle motor is disposed in clean ambience of the HDD and rotates at least one disc mounted on a hub at a rotational speed of 3600 rpm as a steady state revolution together with the hub. The spindle motor having a dynamic pressure fluid bearing according to the first embodiment is detailed next with reference to FIGS. 1-6.

Figure 1:
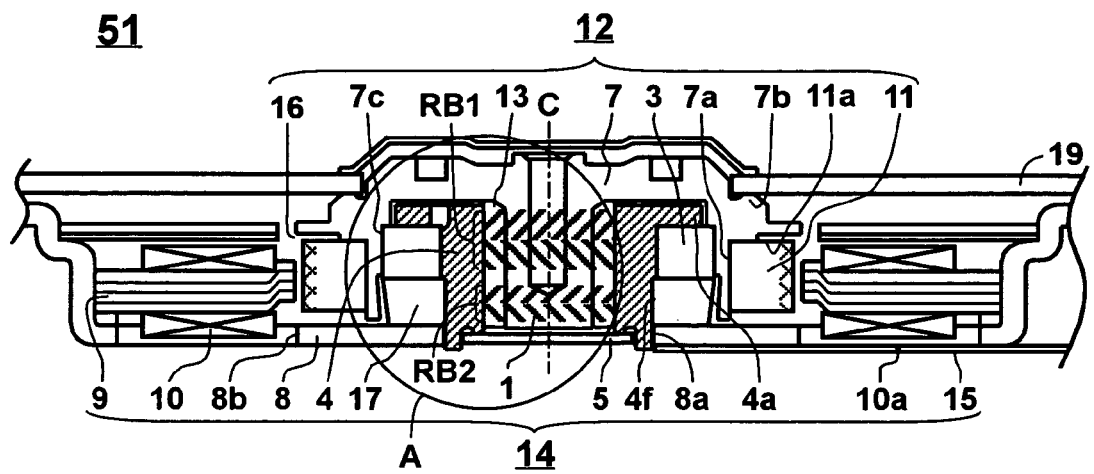
FIG. 1 is a cross sectional view of a spindle motor having a dynamic pressure fluid bearing according to a first embodiment of the present invention.

FIG. 1 is a cross sectional view of a spindle motor having a dynamic pressure fluid bearing according to a first embodiment of the present invention.

Figure 2:
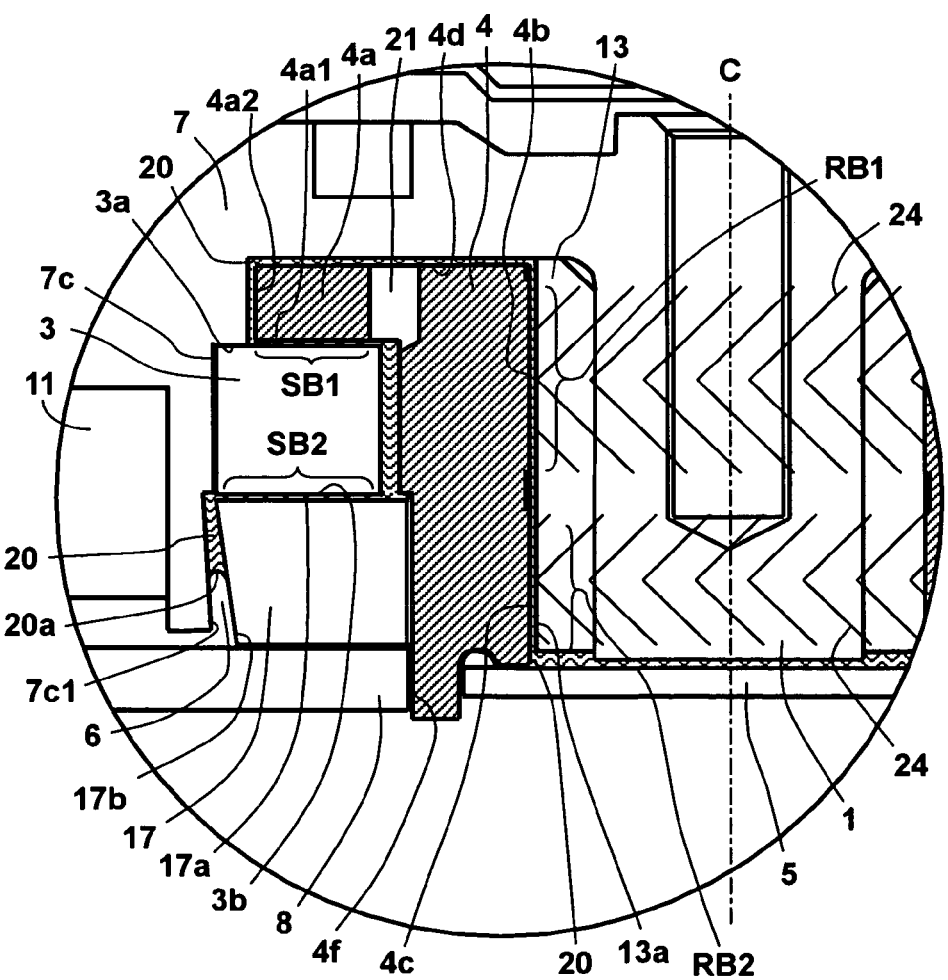
FIG. 2 is a partially enlarged cross sectional view of the spindle motor with enlarging a section "A" in FIG. 1.

FIG. 2 is a partially enlarged cross sectional view of the spindle motor with enlarging a section "A" in FIG. 1.

Figure 3:
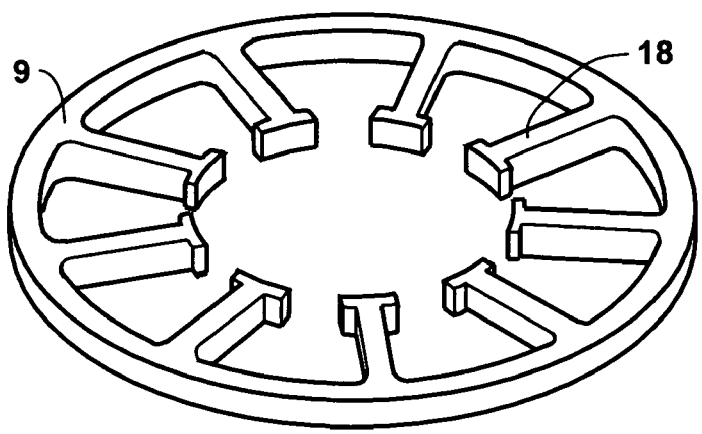
FIG. 3 is a perspective view of a ring core of the spindle motor according to the present invention, wherein the ring core is common to the first to third embodiment.

FIG. 3 is a perspective view of a ring core of the spindle motor according to the present invention common to the first to third embodiment.

Figure 4:
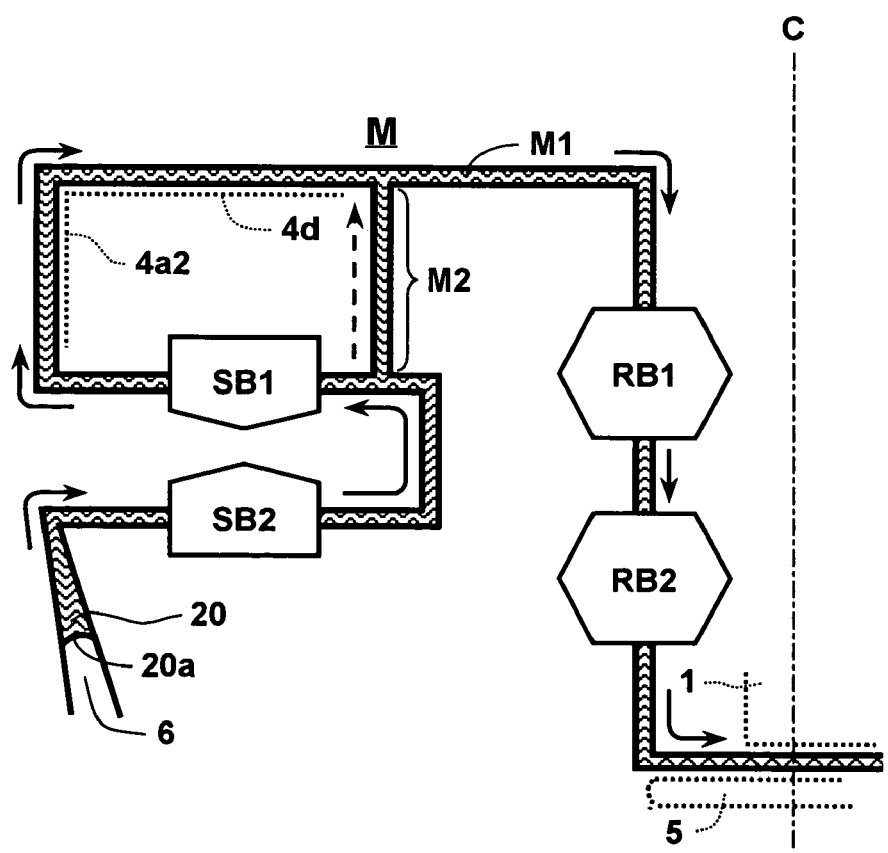
FIG. 4 is a view showing a frame format of a filling section to be filled with lubricant in the spindle motor shown in FIG. 1.

FIG. 4 is a view showing a frame format of a filling section to be filled with lubricant in the spindle motor shown in FIG. 1.

Figure 5:
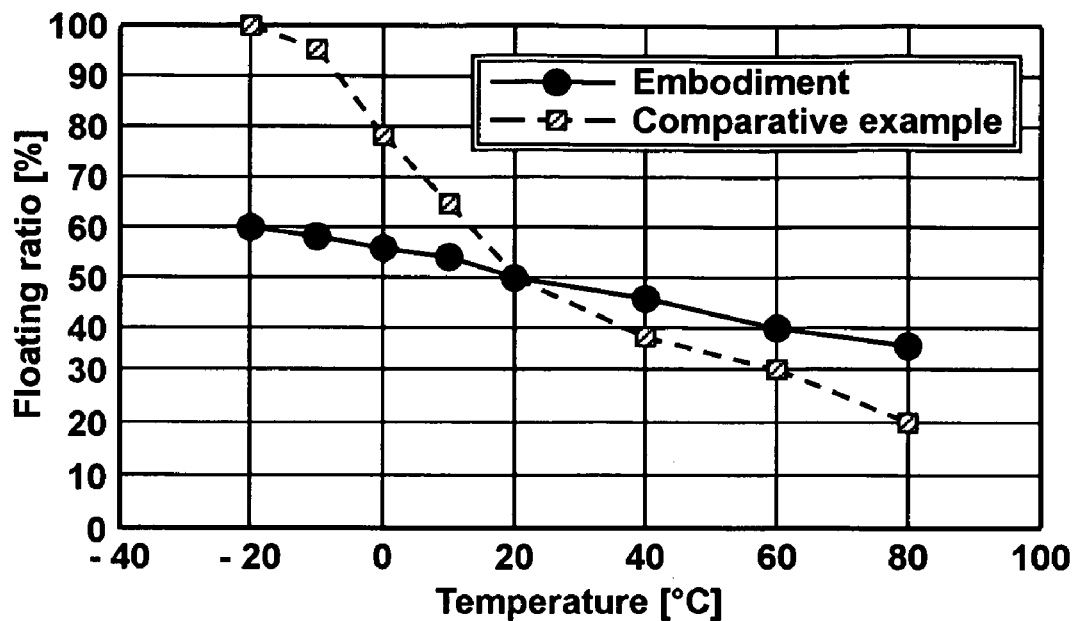
FIG. 5 is a graph showing characteristics of spindle motors according to the first embodiment of the present invention and a comparative example.

FIG. 5 is a graph showing characteristics of spindle motors according to the first embodiment of the present invention and a comparative example.

Figure 6:
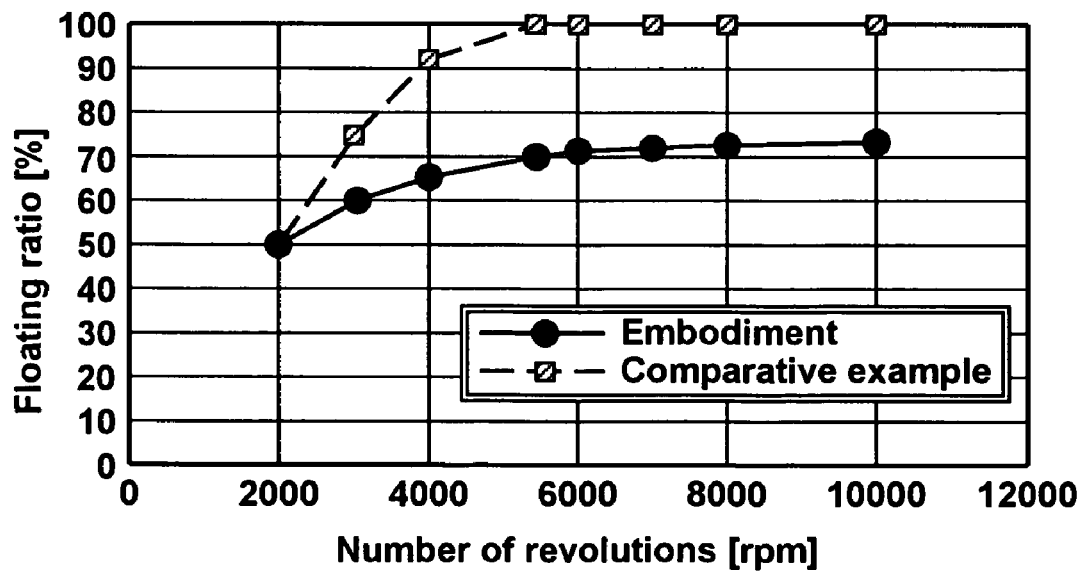
FIG. 6 is a graph showing another characteristics of the spindle motors of the first embodiment and the comparative example.

FIG. 6 is a graph showing another characteristics of the spindle motors of the first embodiment and the comparative example.

As shown in FIG. 1, a spindle motor 51 according to a first embodiment of the present invention is composed of a stator section 14 and a rotor section 12.

The stator section 14 is further composed of a motor base 8, a ring core 9, that is wound up by a coil 10 and fixed to the motor base 8 and a sleeve 4 that is fixed to the motor base 8 so as to be concentric with the ring core 9.

The motor base 8 is made from aluminum die casting through a cutting process or formed by pressing an aluminum or iron plate.

Further, the motor base 8 is provided with a center hole 8a, and the sleeve 4 is fixed to the center hole 8a of the motor base 8 by means of binding agent so as to improve accuracy of assembling.

Each member constituting the stator section 14 is detailed next.

As shown in FIGS. 1 and 2, the sleeve 4 is provided with a through hole 4b and made from copper base alloy such as C3602, aluminum or resin. An opening section of the through hole 4b in the motor base 8 side is sealed by a counter plate 5.

The spindle motor 51 is driven by three-phase current hereupon, so that the ring core 9 is provided with nine protruded poles 18 as shown in FIG. 3. Each protruded pole 18 is wound up by the coil 10.

Further, the ring core 9 is formed by laminating a plurality of silicon steel plates. A surface of the ring core 9 is treated by insulation coating through a process such as electropainting and powder coating.

Furthermore, a terminal 10a of a winding wire of the coil 10 is soldered on a wiring pattern of a flexible printed circuit board (hereinafter referred to as FPC) 15 mounted on a bottom of the motor base 8 by way of a through hole 8b.

More, the FPC 15 is provided with a connecting section for soldering the terminal 10a of the coil 10 thereon, a driving circuit not shown for an HDD and a land section not shown. A wiring pattern electrically connects between the connecting section and the land section.

On the other hand, the rotor section 12 is composed of a hub 7, which is formed in approximately a cup shape and provided with a shaft section 1 that is integrally formed upright with the hub 7 in the center of revolution of the rotor section 12, and a ring magnet 11 that is fixed on an outer circumferential surface 7a of the hub 7. An outer circumferential surface of the shaft section 1 is engaged and fixed with an outer cylindrical section 13 in a cylinder shape.

The hub 7 is made from a stainless steel material through a cutting process, and provided with a loading section 7b for loading a hard disc 19 on the hub 7 in a top surface side.

Further, the hub 7 is generally made from martensitic, ferritic or austenitic stainless steel, and a surface of the hub 7 is coated by electroless nickel plating for the purpose of improving abrasion resistance.

An outer peripheral side, that is, a crosshatched section of the ring magnet 11 is magnetized in twelve magnetic poles, and electropainting is applied on a surface of the ring magnet 11.

In the above-mentioned configuration of the spindle motor 51, the hub 7 and the ring magnet 11 constitute a magnetic circuit of the spindle motor 51. In case a top surface 11a of the ring magnet 11 corresponding to an upper surface of the magnetized crosshatched section of the ring magnet 11 contacts directly with the hub 7, the magnetic circuit is short-circuited. Consequently, a gap 16 is provided therebetween.

Further, the outer cylindrical section 13 of the rotor section 12 is inserted into the through hole 4b of the sleeve 4 and the rotor section 12 is sustained rotatable freely with respect to the stator section 14 through radial and thrust dynamic fluid bearings to be detailed later on.

In this configuration of the spindle motor 51, the rotor section 12 rotates when electric current is sequentially supplied to each phase of the coil 10 by a motor driving circuit (not shown) installed in an HDD.

Description is given to respective radial and thrust dynamic pressure fluid bearings, which sustain the rotor section 12, next.

As shown in FIG. 2, radial dynamic pressure fluid bearings (RB1 and RB2) are constituted by an outer circumferential surface 13a of the outer cylindrical section 13, an inner circumferential surface 4c of the sleeve 4 and lubricating fluid (hereinafter referred to as lubricant) 20 that is filled in a gap between the outer circumferential surface 13a and the inner circumferential surface 4c, and they are allocated in two individual positions being apart from each other in a radial direction.

In other words, as shown in FIGS. 1 and 2, the two radial dynamic pressure fluid bearings are a first radial dynamic pressure fluid bearing section RB1 disposed in an upper side and a second radial dynamic pressure fluid bearing section RB2 disposed in a lower side respectively. Hereupon both the first and second radial dynamic pressure fluid bearing sections RB1 and RB2 are generically referred to as radial dynamic pressure fluid bearing RB in some cases.

In the radial dynamic pressure fluid bearing RB, a plurality of dynamic pressure grooves 24 such as herringbone and Rayleigh step are formed on the outer circumferential surface 13a of the outer cylindrical section 13. However, it should be understood that the dynamic pressure groove 24 enables to be formed on the inner circumferential surface 4c of the sleeve 4.

Further, as mentioned above, the lubricant 20 is filled in the gap between the outer cylindrical section 13 and the sleeve 4, so that a dynamic pressure is generated by the dynamic pressure grooves 24 when the rotor section 12 rotates. Consequently, the rotor section 12 is sustained in the radial direction by the dynamic pressure.

Furthermore, a filling section to be filled with lubricant (hereinafter referred to as lubricant filling section) as the gap filled with the lubricant 20 links the first and second radial dynamic pressure fluid bearings RB1 and RB2. The lubricant filling section will be detailed later on.

A thrust dynamic pressure fluid bearing is detailed next.

As shown in FIGS. 1 and 2, a thrust ring 3 in an annular shape is fixed on an inner circumferential surface 7c of the hub 7.

Further, a flange section 4a protruding outward is formed at an end portion of the sleeve 4 in the hub 7 side, and a seal plate 17 in an annular shape is fixed on an outer circumferential surface 4f at another end portion of the sleeve 4 opposite to the flange section 4a so as to sandwich the thrust ring 3 between the flange section 4a and the seal plate 17.

Furthermore, gaps among surfaces of the thrust ring 3, the flange section 4a and the seal plate 17, which confront with each other, are filled with the lubricant 20.

More, top and bottom surfaces 3a and 3b of the thrust ring 3 are formed with dynamic pressure grooves not shown respectively. The dynamic pressure grooves are such a groove as herringbone and Rayleigh step and they enable to be formed by a process such as etching and stamping.

Moreover, a first thrust dynamic pressure fluid bearing section SB1 is constituted by the top surface 3a of the thrust ring 3, a bottom surface 4a1 of the flange section 4a and lubricant 20 that is filled in a gap between the top surface 3a and the bottom surface 4a1. The first thrust dynamic pressure fluid bearing section SB1 generates a so-called "pump-in" pressure, which pumps the lubricant 20 inward.

In addition thereto, a second thrust dynamic pressure fluid bearing section SB2 is constituted by the bottom surface 3b of the thrust ring 3, a top surface 17a of the seal plate 17 and lubricant 20 that is filled in a gap between the bottom surface 3b and the top surface 17a. The second thrust dynamic pressure fluid bearing section SB2 also generates a "pump-in" pressure, which pumps the lubricant 20 inward, that is, toward the sleeve 4.

In the first and second thrust dynamic pressure fluid bearing sections SB1 and SB2, a lubricant filling section to be filled with the lubricant 20 links between the first and second dynamic pressure fluid bearing sections SB1 and SB2.

Further, the lubricant filling section links between the first thrust dynamic pressure fluid bearing section SB1 and the first radial dynamic pressure fluid bearing section RB1

The lubricant 20 that is filled in the lubricant filling section as mentioned above is prevented from leaking out externally by virtue of a taper seal section 6 to be detailed next.

As shown in FIG. 2, the taper seal section 6 is constituted by an outer circumferential surface 17b of the seal plate 17 and a confronting surface 7c1 of the inner circumferential surface 7c of the hub 7, wherein the confronting surface 7c1 confronts with the outer circumferential surface 17b.

More specifically, the outer circumferential surface 17b and the confronting surface 7c1 approach an axis "C" of rotation of the rotor section 12 respectively in accordance with being apart from the thrust ring 3.

Further, surfaces of the outer circumferential surface 17b and the confronting surface 7c1 are made slanted so as to increase distance between their surfaces in accordance with being apart from the thrust ring 3.

Furthermore, an amount of the lubricant 20 is controlled such that a fluid level 20a of the lubricant 20 positions in a middle of the taper seal section 6 when filling the lubricant 20 while manufacturing the spindle motor 51.

In the taper seal section 6, the lubricant 20 is prevented from leaking out externally by surface tension of the lubricant 20.

Further, by centrifugal force generated by the rotor section 12 when rotating, force, which conducts the lubricant 20 inside the lubricant filling section, is applied to the lubricant 20, and resulting in effectively preventing the lubricant 20 from leaking out externally.

With referring to FIG. 4, a filling section (lubricant filling section) M in which the lubricant 20 is filled is depicted next.

FIG. 4 is a view showing a frame format of the lubricant filling section M as a filling route of the lubricant 20 in the spindle motor 51. In FIG. 4, the lubricant filling section M is composed of a first filling section (first lubricant filling section) M1 and a second filling section (second lubricant filling section) M2. The lubricant 20 enables to flow in the lubricant filling section M by centrifugal force generated in response to revolution of the rotor section 12, so that hereinafter the lubricant filling section M is referred to as filling route M for the sake of convenience.

As shown in FIG. 4, the lubricant 20 is filled in the first lubricant filling section M1 (hereinafter referred to as filling route M1) by way of the taper seal section 6 in which the fluid level 20a positions, the second thrust dynamic pressure fluid bearing section SB2, the first thrust dynamic pressure fluid bearing section SB1, a side surface 4a2 of the flange section 4a, a top surface 4d of the sleeve 4, the first radial dynamic pressure fluid bearing section RB1, the second radial dynamic pressure fluid bearing section RB2 and a gap between the shaft section 1 and the counter plate 5 in order. In FIG. 4, a solid line with arrowhead shows a flowing direction of the lubricant 20 filled in the filling route M1.

The above-mentioned filling route M1 belongs to a so-called fulfilled type lubricating route structure.

As shown in FIG. 4, the spindle motor 51 according to the first embodiment of the present invention is further provided with the second lubricant filling section (hereinafter referred to as bypass route) M2, which links the filling route M1 at a middle point between the first and second thrust dynamic pressure fluid bearing sections SB1 and SB2 and another middle point between the first thrust dynamic pressure fluid bearing section SB1 and the first radial dynamic pressure fluid bearing section RB1. In FIG. 4, a broken line with arrowhead shows a flowing direction of the lubricant 20 in the bypass route M2.

With respect to an actual configuration of the bypass route M2, a linking hole 21, which links top surface 4d of the sleeve 4 and a base of the flange section 4a at an outer circumferential surface of the sleeve 4 underneath the flange section 4a, is exemplified in FIG. 2.

By providing the linking hole 21, that is, the bypass route M2, excessive pressure of the lubricant 20 that occurs in the filling route M1 between the first and second thrust dynamic pressure bearing sections SB1 and SB2 is released toward the first radial dynamic pressure fluid bearing section RB1 side through the bypass route M2 even when a pressure of the lubricant 20 drastically increases by a "pump-in" pressure and centrifugal force while the rotor section 12 rotates at higher rotational speed in particular. Consequently, a pressure of the lubricant 20 in the filling route M1 never increases excessively.

As a result, a floating amount (rising amount) of the rotor section 12 at higher rotational speed in particular is stably maintained, and resulting in preventing the rotor section 12 and the stator section 14 from contacting with each other.

Further, since influence of the "pump-in" pressure, which is generated by the first thrust dynamic pressure fluid bearing section SB1 and affects the second dynamic pressure fluid bearing section SB2, is alleviated, a floating amount of the rotor section 12 is stably maintained, and resulting in preventing the rotor section 12 and the stator section 14 from contacting with each other although ambient temperature changes seriously.

In reference to FIGS. 5 and 6, relationships among a floating amount of a rotor section, ambient temperature and number of revolutions are depicted with respect to the spindle motor 51 having the bypass route M2 according to the first embodiment of the present invention and a spindle motor excluding such a bypass route according to a comparative example.

FIG. 5 exhibits relationships between a floating amount and ambient temperature in case number of rotations of a rotor section is 3600 rpm, and FIG. 6 exhibits relationships between a floating amount and number of revolutions in case ambient temperature is zero degree (0° C.) hereupon. However, similar results to descriptions mentioned below are obtained at any other number of revolutions or temperature.

As shown in FIG. 5, a floating ratio of a spindle motor of a comparative example jumps up to approximately 80% at 0° C. and 100% at −20° C., and resulting in increasing rotational load extremely.

In case a floating ratio is in such a higher ratio, it is high in possibility that a top surface of a thrust ring contacts with a bottom surface of flange section of a sleeve.

Further, the floating ratio at −20° C. is 100%, that is, the rotor section contacts with the stator section at −20° C.

Furthermore, the floating ratio lowers less that 20% at 80° C. and above. Consequently, rotational load is large within this temperature range, and resulting in increasing possibility of contacting a bottom surface of the thrust ring with a top surface of flange section of the sleeve.

On the other hand, in case of the spindle motor 51 of the present invention, a variation range of a floating ratio within a temperature range from −20° C. to 80° C. is extremely small in comparison with that of the comparative example. The floating ratio of the present invention is within a range of 35% to 60%.

As mentioned above, it is apparent that the spindle motor 51 according to the first embodiment of the present invention exhibits a stable characteristic with respect to temperature change.

In FIG. 6, a floating ratio of the spindle motor according to the comparative example reaches to 100% at number of revolutions of approximately 5500 rpm and above. Consequently, it is apparent that the rotor section contacts with the stator section in the spindle motor of the comparative example.

On the other hand, in case of the spindle motor 51 according to the first embodiment of the present invention, a floating ratio is maintained within an excellent range of 30% to 50% over at least a range from 2000 rpm to 10000 rpm, and resulting in exhibiting that the spindle motor 51 is excellently stable.

Particularly, within a range of higher rotational speed of more than 6000 rpm, the floating ratio is maintained approximately constant. Consequently, it is expected that the spindle motor 51 of the present invention exhibits a stable floating ratio even in a range of super high rotational speed of exceeding 10000 rpm.

As mentioned above, the spindle motor 51 according to the first embodiment of the present invention exhibits that a floating ratio of the rotor section 12 enables to be kept within an excellent numerical range in spite of temperature change or any number of revolutions, and to be excellently maintained in stable state.

Second Embodiment

A spindle motor according to a second embodiment of the present invention is identical to the spindle motor 51 according to the first embodiment except for the sleeve 4, so that details of a spindle motor other than a sleeve are omitted.

Figure 7A:
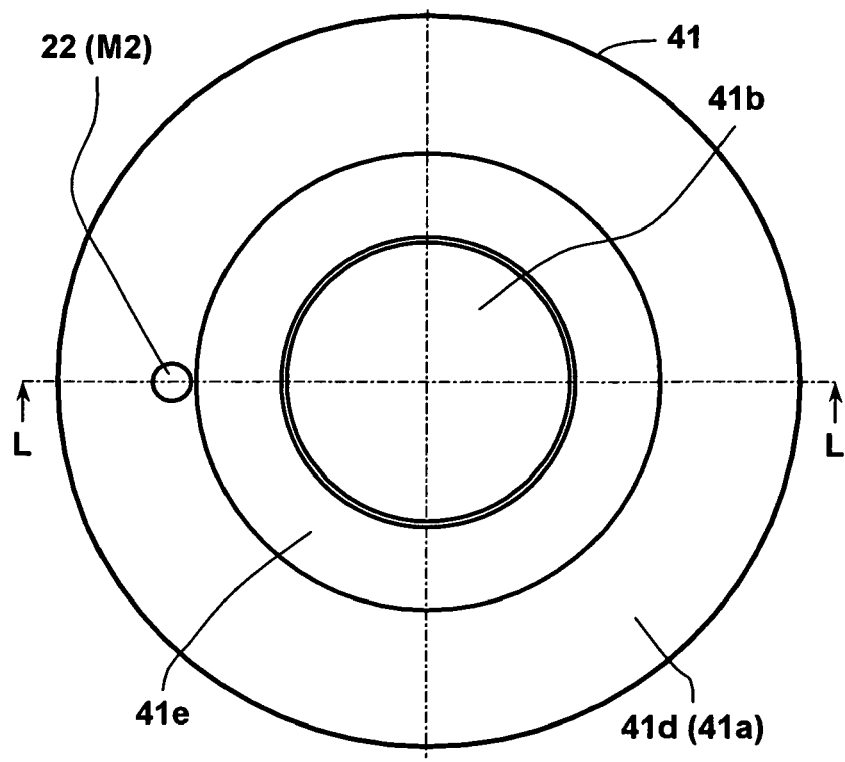
FIG. 7(a) is a plan view of a sleeve according to a second embodiment.
Figure 7B:
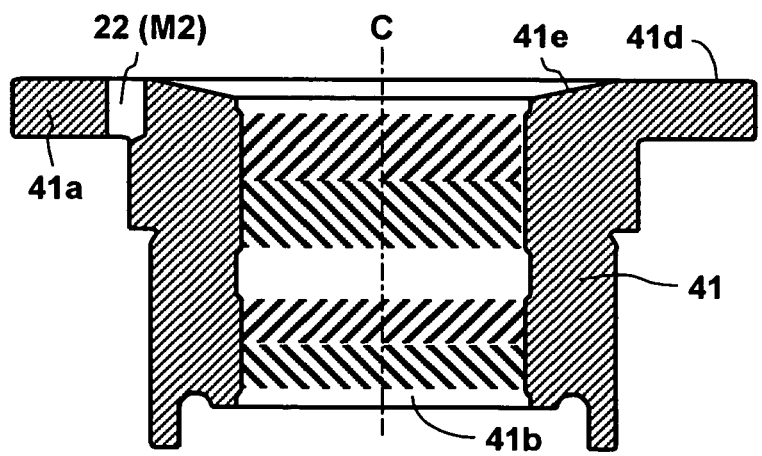
FIG. 7(b) is a cross sectional view of the sleeve taken along line L-L of FIG. 7(a).

A sleeve having a linking hole according to the second embodiment is exemplified in FIGS. 7(a) and 7(b).

FIG. 7(a) is a plan view of a sleeve according to a second embodiment, and FIG. 7(b) is a cross sectional view of the sleeve taken along line L-L of FIG. 7(a).

As shown in FIG. 7(a), one linking hole 22 having a diameter of 0.3 mm is bored in a flange section 41a of a sleeve 41.

Further, the sleeve 41 is provided with an inclined plane 41e, which inclines toward a through hole 41b of the sleeve 41 or the axis "C" of rotation, in an inner circumferential area of a top surface 41d of the sleeve 41. The inclined plane 41e is provided for the purpose of improving mechanical strength of the hub 7 that confronts with a top surface 41d of the sleeve 41, wherein the inclined plane 41e enables to bring the thickness of the hub 7 at a base section of the shaft section 1.

Third Embodiment

A spindle motor according to a third embodiment of the present invention is identical to the spindle motor 51 according to the first embodiment except for the sleeve 4, so that details of a spindle motor other than a sleeve are omitted.

Further, a sleeve of the third embodiment is identical to the sleeve 41 of the second embodiment except for the linking hole 22, so that the same components and sections are denoted by the same reference signs and their details are omitted.

Figure 8A:
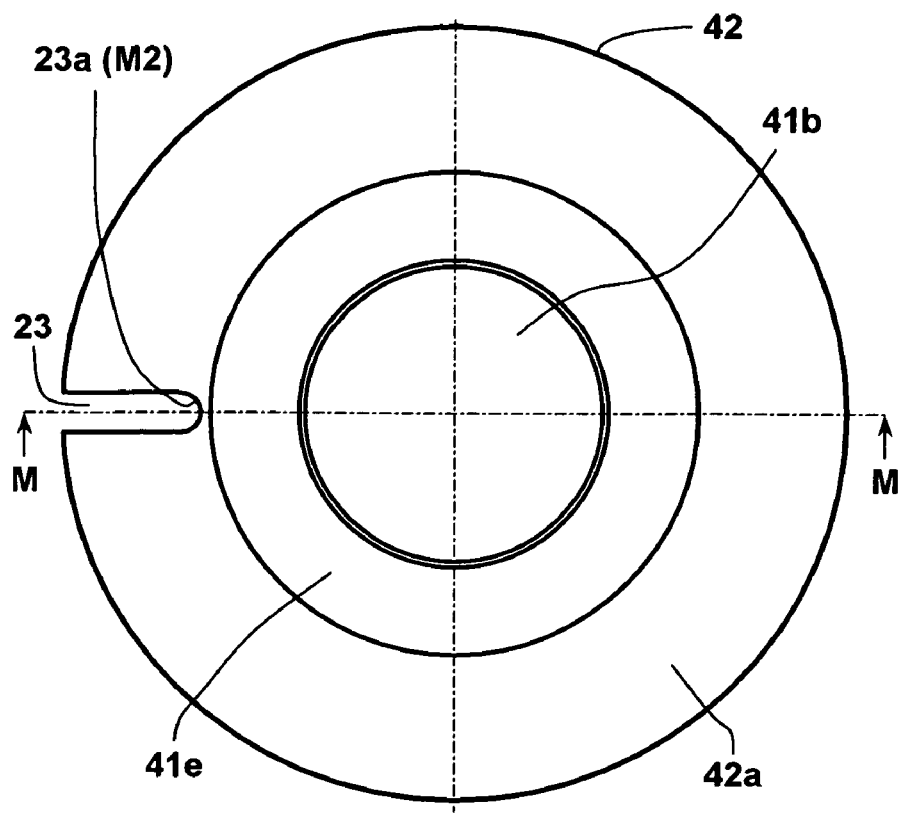
FIG. 8(a) is a plan view of a sleeve according to a third embodiment of the present invention.
Figure 8B:
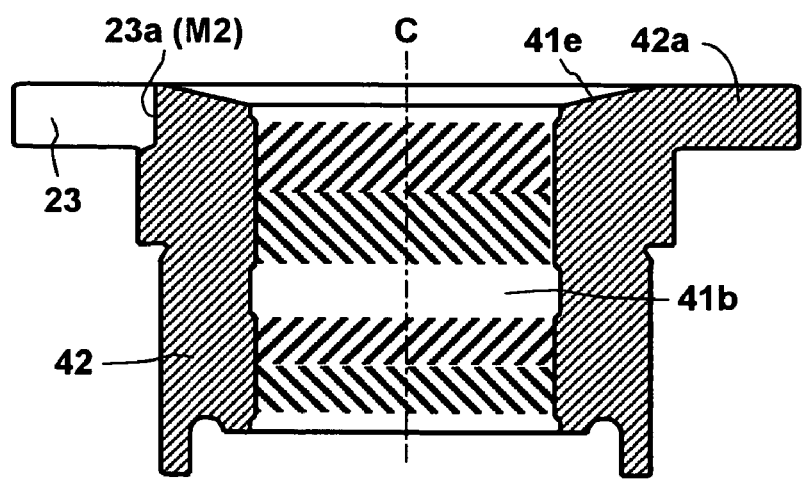
FIG. 8(b) is a cross sectional view of the sleeve taken along line M-M of FIG. 8(a).

FIG. 8(a) is a plan view of a sleeve according to a third embodiment of the present invention, and FIG. 8(b) is a cross sectional view of the sleeve taken along line M-M of FIG. 8(a).

As shown in FIG. 8(a), a bypass route M2 of a sleeve 42 according to the third embodiment of the present invention is not a circular hole but a notch 23 in a U-letter shape that is formed in a flange section 42a of the sleeve 42. In this case, an end portion 23a of the notch 23 in the axis "C" of rotation side positions in between the first and second dynamic pressure fluid bearing sections SB1 and SB2 and is equivalent to the bypass route M2 shown in FIG. 4.

Accordingly, the notch 23 functions as the bypass route M2 and effectively enables to prevent the lubricant 20 from leaking out externally.

Fourth Embodiment

A spindle motor according to a fourth embodiment of the present invention is identical to the spindle motor 51 according to the first embodiment except for the sleeve 4, so that details of a spindle motor other than a sleeve are omitted.

Figure 9A:
FIG. 9(a) is a cross sectional view of a flange in a ring shape according to a fourth embodiment of the present invention.
Figure 9B:
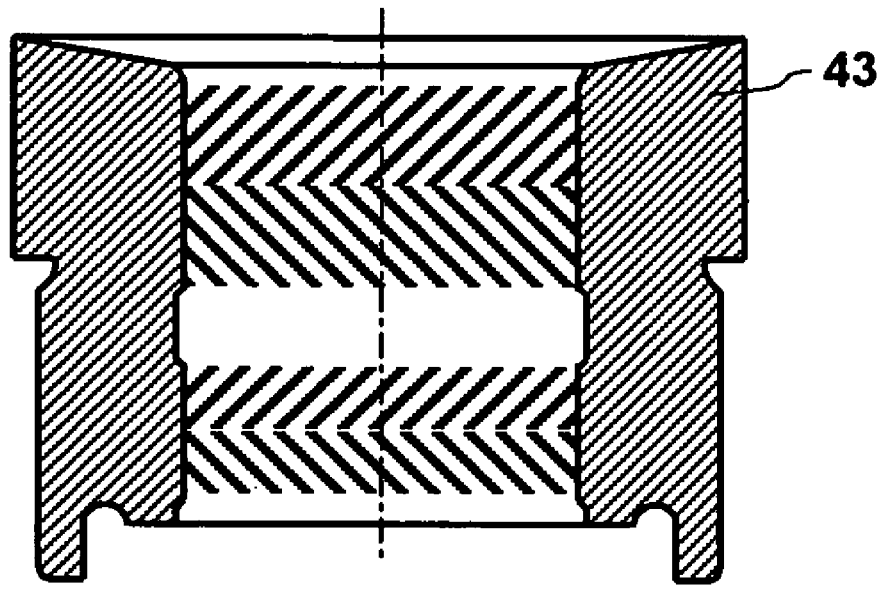
FIG. 9(b) is a cross sectional view of a sleeve according to the fourth embodiment of the present invention, wherein the flange shown in FIG. 9(a) is force fitted onto the sleeve.
Figure 10:
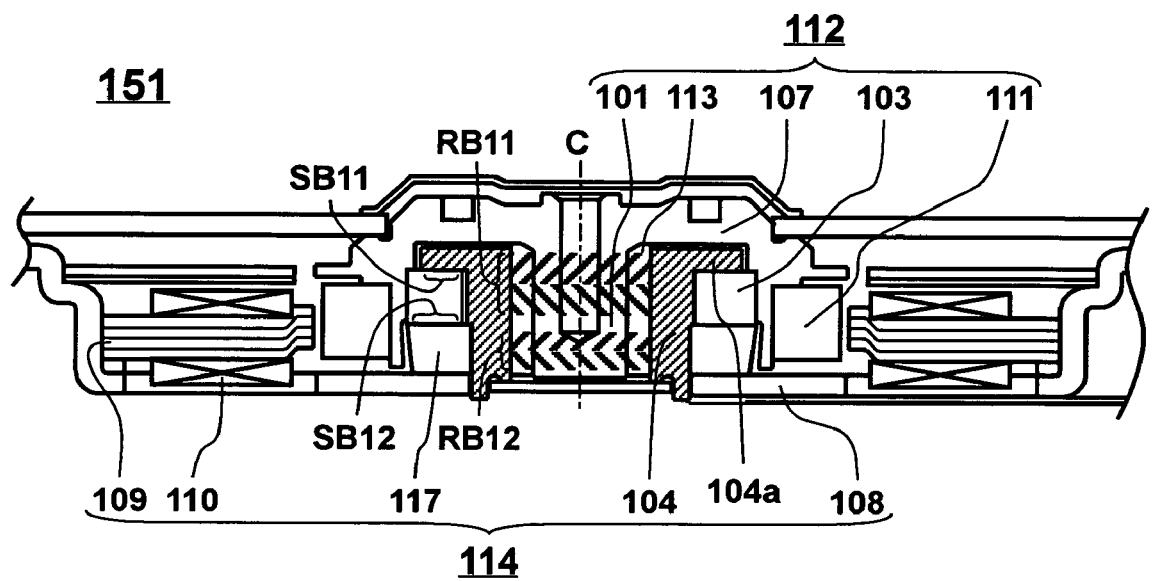
FIG. 10 is a cross sectional view of a conventional spindle motor according to the prior art.

FIG. 9(a) is a cross sectional view of a flange in a ring shape according to a third embodiment of the present invention, and FIG. 9(b) is a cross sectional view of a sleeve according to the third embodiment of the present invention, wherein the flange shown in FIG. 9(a) is force fitted onto the sleeve.

In the fourth embodiment, as shown in FIGS. 9(a) and 9(b), a flange section is separated from a sleeve 43 and individually formed as a flange 24 in a ring shape. A groove 24a is provided in an inner circumferential section of the flange 24 in the axial direction. The flange 24 is force fitted onto the sleeve 43 and the groove 24a forms a through hole that is equivalent to the bypass route M2 shown in FIG. 4.

Accordingly, the through hole formed by the groove 24a functions as a bypass route M2 and effectively enables to prevent the lubricant 20 from leaking out externally.

As mentioned above, according to the present invention, a spindle motor having a dynamic pressure fluid bearing ensures higher reliability without increasing power consumption even at a higher rotational speed.

Further, the spindle motor having a dynamic pressure fluid bearing ensures higher reliability without increasing power consumption even ambient temperature changes drastically.

While the invention has been described above with reference to a specific embodiment thereof, it is apparent that many changes, modifications and variations in configuration, materials and the arrangement of equipment and devices can be made without departing form the invention concept disclosed herein.

For instance, it shall be understood that the shaft section 1 enables to be separated from the hub 7 and to be directly force fitted into a through hole provided in the hub 7.

Further, it shall also be understood that the outer cylindrical section 13 enables to be omitted and the shaft section 1 is directly inserted into the through hole 4a of the sleeve 4. In this case, an outer circumferential surface of the shaft section 1 functions as a surface constituting the first and second radial dynamic pressure fluid bearing sections RB1 and RB2 instead of the outer circumferential surface 13a of the outer cylindrical section 13.

Furthermore, even in case, of providing the outer cylindrical section 13 as mentioned in the first embodiment, it shall be understood that constitutional concept of the shaft section 1 includes the outer cylindrical section 13.

In addition thereto, it will be apparent to those skilled in the art that various modifications and variations could be made in the motor and the disc drive apparatus field in the present invention without departing from the scope of the invention.

What is claimed is:

1. A spindle motor comprising:
    a rotor section;
    a stator section; and
    a thrust dynamic pressure fluid bearing and a radial dynamic pressure fluid bearing for sustaining the rotor section to be rotatable freely with respect to the stator section by employing lubrication fluid,
    wherein the thrust dynamic pressure fluid bearing is provided with first and second thrust dynamic pressure fluid bearing sections each generating a dynamic pressure in a direction opposite to each other, and
    wherein the lubrication fluid is filled in a filling section as a prescribed gap provided between the rotor section and the stator section, and
    wherein the filling section is constituted by a first filling section that links one end section opened to the outside, the second thrust dynamic pressure fluid bearing section, the first thrust dynamic pressure fluid bearing section and the radial dynamic pressure fluid bearing in order and a second filling section that links a point allocated between the second and first thrust dynamic pressure fluid bearing sections and another point allocated between the first thrust dynamic pressure fluid bearing section and the radial dynamic pressure fluid bearing in the first filling section.

2. The spindle motor as claimed in claim 1, wherein the rotor section further comprises a hub in approximately a cup shape, a thrust ring in an annular shape fixed in an inner circumferential section of the hub and a shaft section integrally formed with the hub, and
    wherein the stator section further comprises a sleeve in approximately a cylindrical shape having a flange section and a seal plate fixed in an outer circumferential section of the sleeve with sandwiching the thrust ring between the flange section and the seal plate, and
    wherein the shaft section is engaged with the sleeve, and resulting in sustaining the rotor section so as to be rotatable freely with respect to the stator section through the thrust and radial dynamic pressure fluid bearings, and
    wherein the radial dynamic pressure fluid bearing is constituted by the shaft section and the sleeve, and
    wherein the first thrust dynamic pressure fluid bearing section is constituted by surfaces of the thrust ring and the flange section each confronting with the other, and
    wherein the second thrust dynamic pressure fluid bearing section is constituted by surfaces of the thrust ring and the seal plate each confronting with the other, and
    wherein the sleeve is provided with a linking hole that links the point allocated between the second and first thrust dynamic pressure fluid bearing sections and the other point allocated between the first thrust dynamic pressure fluid bearing section and the radial dynamic pressure fluid bearing as the second filling section.

3. The spindle motor as claimed in claim 1, wherein the second thrust dynamic pressure fluid bearing section generates force to move the lubrication fluid toward the radial dynamic pressure fluid bearing in accordance with revolution of the rotor section.

* * * * *